(12) United States Patent
Saban et al.

(10) Patent No.: US 6,934,666 B2
(45) Date of Patent: Aug. 23, 2005

(54) METHOD FOR OPTIMIZING STRATEGY FOR ELECTRIC MACHINES

(75) Inventors: Daniel M. Saban, Rockford, IL (US); John L. Oldenkamp, Fort Wayne, IN (US); Liping Wang, Rexford, NY (US); Krishnakumar Badhrinath, Niskayuna, NY (US); Ravindra V. Tappeta, Clifton Park, NY (US); Patrick L. Jansen, Alplaus, NY (US)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 09/682,762

(22) Filed: Oct. 15, 2001

(65) Prior Publication Data

US 2003/0074165 A1 Apr. 17, 2003

(51) Int. Cl.[7] .............................................. G06F 17/50
(52) U.S. Cl. ................. 703/2; 703/1; 310/42; 310/261
(58) Field of Search ............... 703/1, 2, 6, 14, 703/13; 310/42, 261, 211; 29/596, 609; 72/354, 355, 353

(56) References Cited

U.S. PATENT DOCUMENTS

| | | | | |
|---|---|---|---|---|
| 4,951,377 A | * | 8/1990 | Fritzsche | 29/596 |
| 6,198,181 B1 | * | 3/2001 | Ali et al. | 310/42 |

* cited by examiner

Primary Examiner—Thai Phan
(74) Attorney, Agent, or Firm—Armstrong Teasdale LLP (57) ABSTRACT

A method is provided to facilitate optimizing a winding and lamination configuration an electric machine. The method employs a computer including a microprocessor for executing computer functions, a database for storing optimization data, and a two-level optimization algorithm that has a first optimization module and a second optimization module. The method includes generating a plurality of data sets utilizing the first determining an optimum response surface based the data sets, utilizing the second module, determining an optimum data set based on the optimum response surface, utilizing the first module, and outputting an optimum winding and lamination configuration based on the optimum data set.

31 Claims, 5 Drawing Sheets

METHOD FOR OPTIMIZING STRATEGY FOR ELECTRIC MACHINES

BACKGROUND OF INVENTION

This invention relates generally to electric machines and, more particularly, to an optimization strategy for designing induction motors and generators.

Known motors including synchronous machines, non-synchronous machines, and direct current (DC) machines, include a motor housing, a stator including one or more windings, or one or more permanent magnets, and a rotor assembly. The rotor assembly includes a rotor core and a rotor shaft that extends through the rotor core. The rotor is constructed of a plurality of laminations and includes one or more armature windings one or more permanent magnets. The motor housing includes at least one endshield and houses at least a portion of the rotor assembly. At least one bearing receives and the rotor shaft, and is positioned between the endshield and an inner bearing cap to enable the rotor shaft to rotate during operation.

At least some known motors are configured to satisfy pre-determined steady state operating requirements such as a rated voltage, a locked rotor voltage, and a breakdown voltage. Two key components for satisfying operating requirements are lamination geometry and winding variables. The lamination geometry and winding variables are configured to facilitate optimizing performance cost variables associated with the motor design. At least some known design methods attempt to optimize a winding after a lamination design is know. This design method may only provide acceptable results the bounds of the particular lamination, and as such, does not allow the assertion that a global optimum has been found. Other known methods attempt to simultaneously optimize all the winding variables and lamination geometry variables. This design is much more complex and computationally expensive.

SUMMARY OF INVENTION

In one aspect, a method is provided to facilitate optimizing a winding and lamination configuration of an electric machine. The method employs a computer including a microprocessor for executing computer functions, a database for storing optimization data, and a two-level optimization algorithm that has a first optimization module and a second optimization module. The method includes generating a plurality of data sets utilizing the first module, determining an optimum response surface based the data sets, utilizing the second module, determining an optimum data set based on the optimum response surface, utilizing the first module, and outputting an optimum winding and lamination configuration based on the optimum data set.

In another aspect, a system is provided for optimizing a winding and lamination configuration of an electric machine. The system includes a computer including a microprocessor for executing computer functions, a database coupled to the microprocessor for storing data, and a two-level optimization algorithm comprising a optimization module and a second optimization module. The two-level optimization algorithm uses data stored in the database and is executed via the microprocessor.

In yet another aspect, a two-level optimization algorithm is provided for optimizing a winding and lamination configuration of an electric machine. The two-level optimization algorithm includes a first optimization module and a second optimization module. The optimization module is configured to generate a first optimization solution based on output from the second optimization module, and the second optimization is configured generate a second optimization solution based on output from the first optimization module. Furthermore, the two-level optimization algorithm is also configured to generate a global optimization solution based on the first and second optimization solutions.

DETAILED DESCRIPTION

Figure 1:
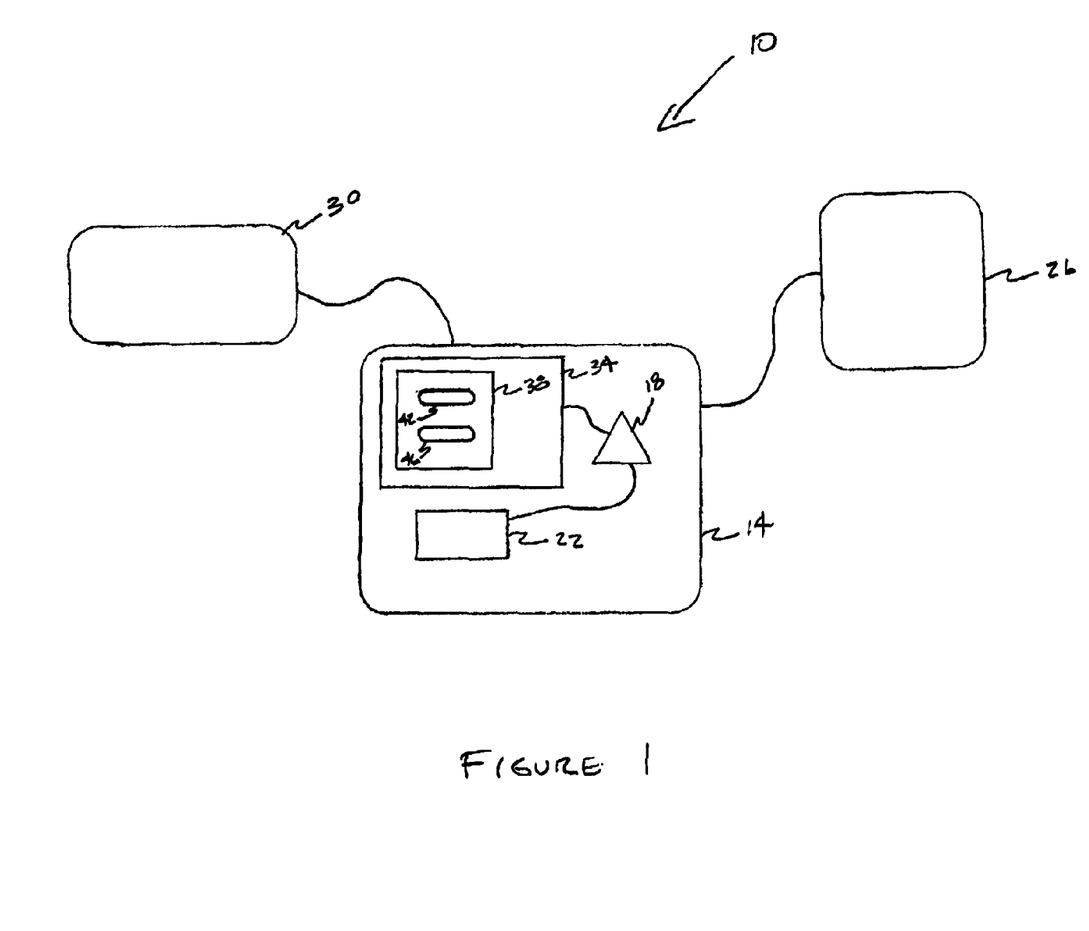
FIG. 1 is schematic of a system to facilitate optimizing a winding-lamination configuration of an electric machine.

FIG. 1 is schematic of a system 10 to facilitate optimizing a winding a lamination configuration of an electric machine in accordance with one embodiment of the present invention. System 10 includes a computer 14, which includes a processor 18 suitable to execute all functions of computer 14, and an electronic storage device, or database, 22 storing programs, information and data. Additionally, computer 14 is connected to a display 26 for displaying information, data, and graphical representations, and a user interface 30 that enables a user to input information, data, and queries to computer 14, example a keyboard or a mouse. In the exemplary embodiment, computer 14 also a second electronic storage device 34, which stores an optimization algorithm 38. Optimization algorithm 38 implements a two-level optimization strategy that includes a winding optimization level and lamination optimization level. Accordingly, algorithm 38 includes a first module, such as winding optimization module 42 and a second module, such as lamination optimization module 46. In an alternate embodiment algorithm 38 is included within database 22. Two-level optimization algorithm 38 links a solution for an optimal lamination, computed at the lamination optimization level by lamination module 46, to a solution for an optimal winding, computed at the winding level by winding 42.

Two-level optimization algorithm 38 processes small sets of variables at both the winding optimization level and the lamination optimization level. Additionally, solutions computed by modules 42 and 46 are decomposed such that more autonomy is given to lamination and winding designers, while at the same time taking into account both and lamination preferences.

Figure 2:
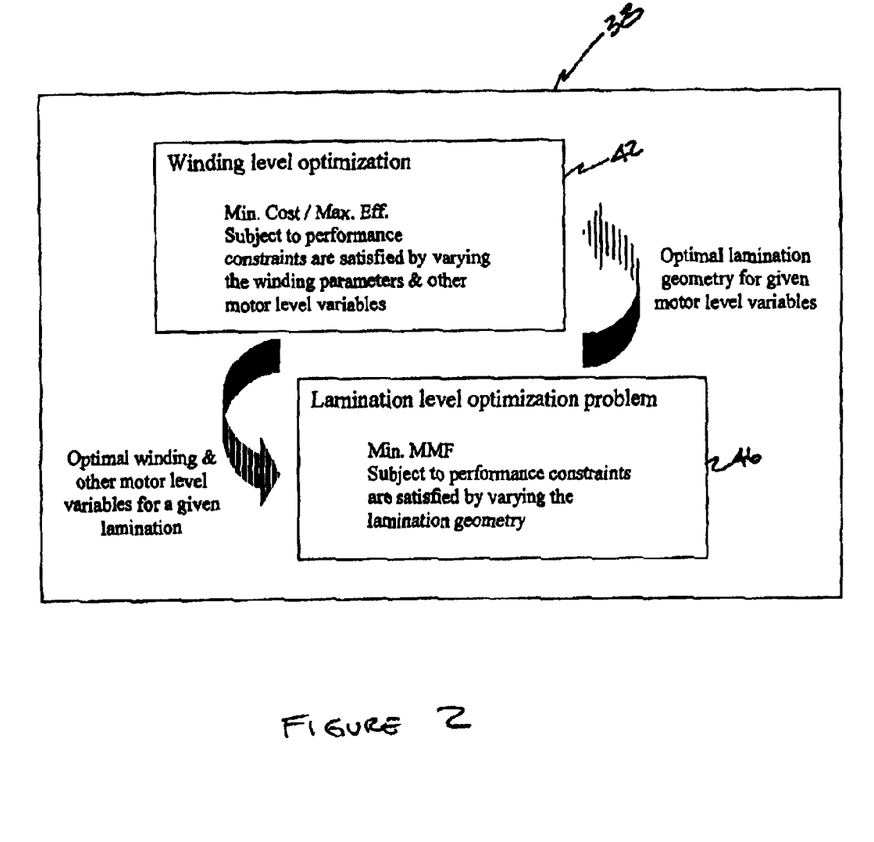
FIG. 2 is an exemplary embodiment of a detailed diagram of a two-level algorithm utilized by the system shown in FIG. 1.

FIG. 2 is an exemplary embodiment of a detailed diagram of two-level optimization algorithm 38 (shown in FIG. 1) utilized by system 10 (shown in FIG. 1). Components FIG. 2 identical to components of system 10 of FIG. 1 are identified in FIG. 2 using the same reference numerals as used in FIG. 1. Database 22 (shown in FIG. 1) winding parameters, including but not limited to, wire size, number of turns, capacitor size, frame size, number of windings, and number of coils. Winding optimization module 42 utilizes a mathematical programming model for winding level that includes motor level variables, including but not limited to, winding material, i.e. copper or aluminum wire, capacitor size, motor housing size, frame size, number of windings, number of coils and wire size. Lamination module 46 utilizes a mathematical programming model for lamination level optimization that has continuous and discrete lamination geometry variables. Continuous lamination geometry variables, such as slot thickness, inner diameter, outer diameter and slot spacing, are variables that have an open set of values. For example, the slot thickness variable can be chosen to be 0.325 inches, or 1.0 inches, or 1.8 inches, or any number there between. Discrete lamination variables, such as sheet thickness, are variables that have a closed set of values. For example, possible sheet thickness values may only be values selected from available manufactured thicknesses.

A designer utilizes interface 30 (shown in FIG. 1), to input two sets of performance constraints. The first set of performance constraints relate to lamination geometries such as a number of lamination layers, and lamination size. The second set of performance constraints are determined by desired performance requirements, such as, but not to, motor size, efficiency, power output, cost, torque, current, current density, and motor speed. After the performance constraints are input, winding optimization module 42 utilizes the winding parameters stored in database 22 to compute and output a plurality solutions, or data sets, for the winding level optimization mathematical programming model. The plurality of solutions output are solutions of the winding level optimization mathematical programming model using different possible combinations of winding parameters and motor level variables. Thus, winding optimization module 42 varies both the motor level variables and the winding parameters used by the winding level optimization mathematical programming model to compute a plurality of different winding configurations.

The possible winding configurations are output to lamination module 46 wherein the winding configurations are used to solve the lamination level optimization mathematical programming model. Lamination module 46 computes an optimum lamination geometry configuration for each winding configuration output from winding module 42. Lamination optimization module 46 uses outputs from winding optimization module 42 and lamination geometry variable data stored in database 22, including machinability data, to compute a lamination geometry that will combine with each respective winding module output to satisfy at least one constraint of the first set of performance constraints input a designer. Each lamination geometry is then output to database 22. Lamination module 46 then utilizes the lamination geometries stored in database 22 and the second set of performance constraints to determine an optimum geometry response surface. The optimum geometry response surface includes the lamination geometries computed by lamination optimization module 46 that satisfy at least one of the constraints in the set of performance constraints.

The optimum geometry response surface is then output to winding optimization module 42 wherein at least one optimum winding solution, or data set, is computed. To compute the optimum winding solution, winding optimization module 42 varies the level variables and a corresponding optimum lamination for each variation is obtained the optimum geometry response surface to produce a candidate winding-lamination configuration. Algorithm 38 (shown in FIG. 1) is then used to compute manufacturing objectives, such as cost and efficiency ratings for each candidate winding-lamination configuration. Each candidate winding-lamination configuration is then output, along the corresponding cost and performance values, and evaluated to determine a global, or optimum desirable, winding-lamination configuration. In one embodiment, the candidate winding-lamination configurations output by algorithm 38 are stored in a database such database 22.

Figure 3:
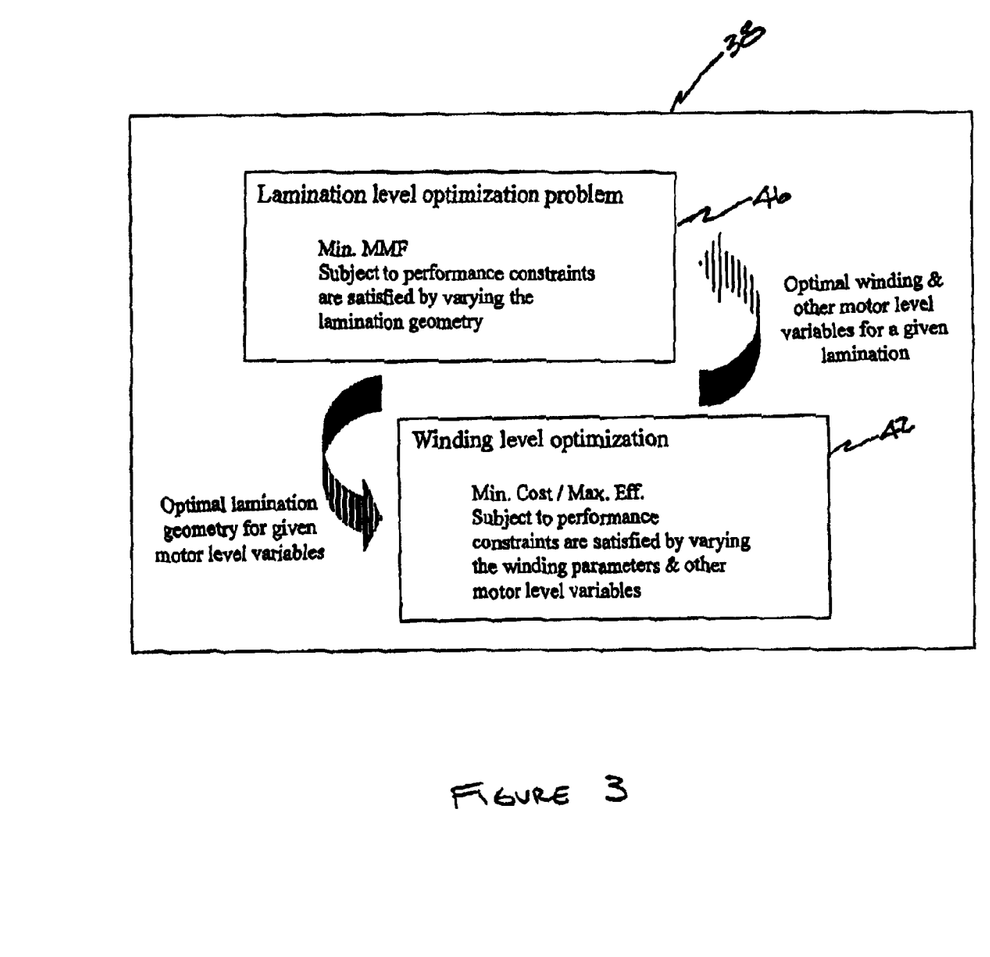
FIG. 3 is an alternate embodiment of a detailed diagram of a two-level algorithm utilized by the system shown in FIG. 1.

FIG. 3 is an alternate embodiment of a detailed diagram of two-level optimization algorithm 38 (shown in FIG. 1) utilized by system 10 (shown in FIG. 1). Components FIG. 3 identical to components of system 10 of FIG. 1 are identified in FIG. 3 using the same reference numerals as used in FIG. 1. Database 22 (shown in FIG. 1) winding parameters such as wire size, number of turns, capacitor size, frame size, of windings, and number of coils. Database 22 also includes a list of standard manufactured laminations geometries and specific data relating to the characteristics of each lamination geometry, including but not limited to, slot thickness, sheet thickness, inner diameter, outer diameter, and slot spacing. Winding optimization module 42 a mathematical programming model to facilitate winding level optimization. The mathematical programming model utilizes motor level variables such as winding i.e. copper or aluminum wire, capacitor size, motor housing size, frame size, number of windings, number of coils and wire size. Lamination module 46 utilizes a mathematical programming model for lamination level optimization having lamination geometry variables, such as slot thickness, inner diameter, outer diameter, slot spacing and sheet thickness.

A designer utilizes interface 30 (shown in FIG. 1), to input two sets of performance constraints. The first set of performance constraints relate to lamination geometries such as a number of lamination layers, and a lamination size. The second set of performance constraints are determined by desired performance requirements, such as, but not to, motor size, efficiency, power output, cost, torque, current, current density, and motor speed. After the performance constraints are input, lamination optimization module 46 generates and outputs a plurality of solutions, or data sets, for the lamination level optimization mathematical programming model. The plurality of outputs solve for lamination geometries that satisfy at least one of the constraints in the first set of performance constraints. The plurality of lamination geometries generated is selected the standard manufactured lamination geometries stored in database 22.

The possible lamination geometries are output to winding optimization module 42 wherein the lamination geometries are used to solve the winding level optimization mathematical program model. Winding optimization module 42 utilizes the winding parameters motor level variables stored in database 22 to compute at least one optimum winding configuration for each lamination geometry that will combine with the lamination geometry to satisfy at least one constraint of the second set of performance constraints. Each winding configuration is then output to database 22. Winding module 42 then the winding configurations stored in database 22 to determine an optimum winding variable response surface for each lamination geometry output by lamination module 46. The optimum winding variable response surfaces include all the computed winding configurations for the related lamination geometry.

The optimum winding variable response surfaces are then output to lamination 46 wherein at least one optimum lamination solution, or data set, is computed. To compute the optimum lamination solution, lamination module 46 varies the lamination geometry variables and corresponding optimum winding variables are obtained from the optimum winding variable response surfaces to produce a candidate winding-lamination configuration for each variation. Subject to at least one constraint in the second set of performance constraints, algorithm 38 (shown in FIG. 1) is then used to compute manufacturing objectives, such as cost, magnetomotive force (MMF), efficiency rating, or combination of these, for each candidate winding-lamination configuration. Each winding-lamination configuration is then output, along with the corresponding cost and performance values, and evaluated to determine a global, or optimum desirable, lamination configurations. In one embodiment, the candidate winding-lamination configurations output by algorithm 38 are stored in a database such as database 22.

Figure 4:
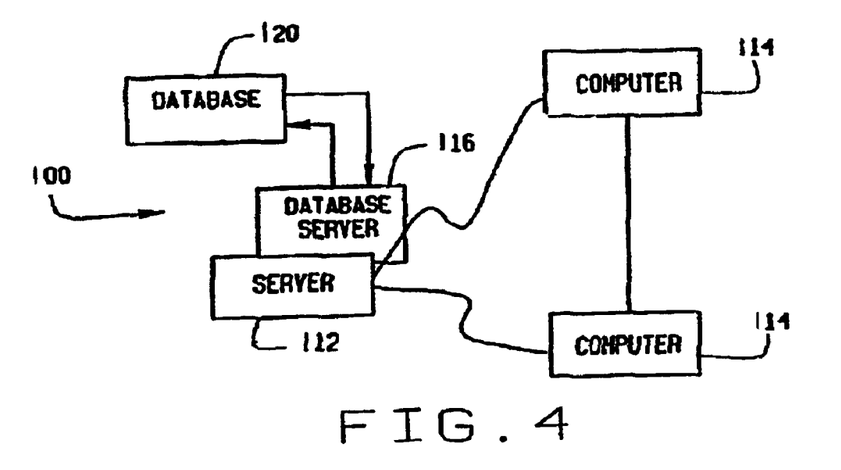
FIG. 4 is a simplified block diagram of a server architecture used with the system shown in FIG. 1 for facilitating optimizing a winding-lamination configuration.

FIG. 4 is a simplified block diagram of a server system 100 for optimizing a lamination configuration. In an alternative embodiment, computer 14 (shown in FIG. 1) part of a computer network that is accessible using the Internet. System 100 includes a server system 112 and a plurality of client systems 114 connected to server system 112. one embodiment, client systems 114 are computers, such as computer 14 (shown in 1), including a web browser, such that server system 112 is accessible to client systems 114 via the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone or other web-based connectable equipment. A database server 116 is connected to a centralized database 120 containing product related information on a variety of products, as described below in greater detail. In one embodiment, centralized database 120 is stored on server system 112 and can be accessed by potential users at of client systems 114 by logging on to server system 112 through one of client systems 114. In an alternative embodiment centralized database 120 is stored remotely from system 112.

Figure 5:
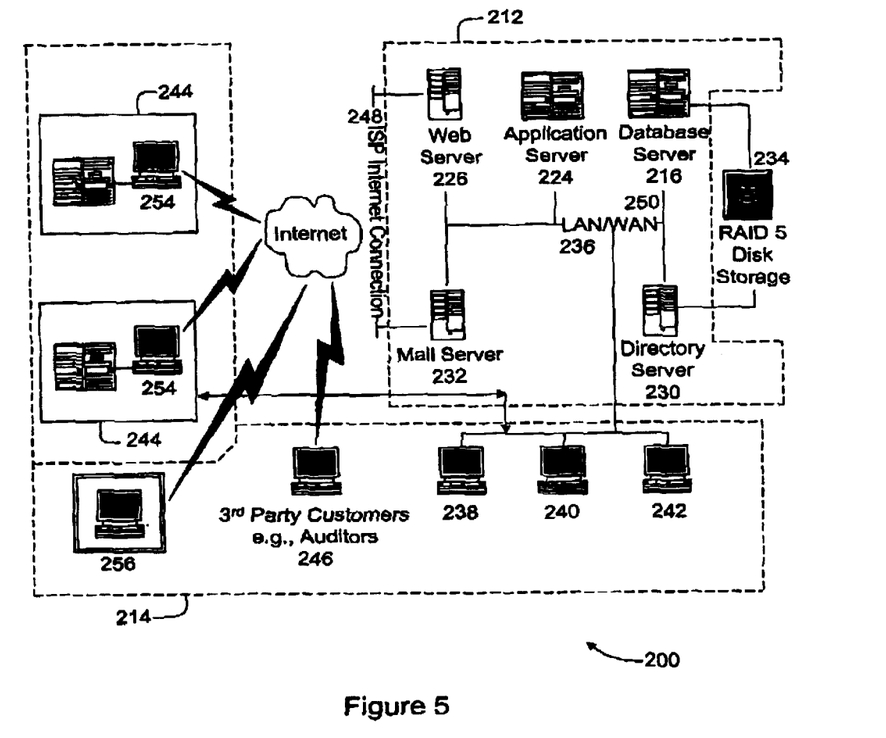
FIG. 5 is an expanded version block diagram of an alternate embodiment of a architecture for facilitating optimizing a winding-lamination configuration.

FIG. 5 is an expanded version block diagram of an alternate embodiment of a architecture 200 for optimizing a winding-lamination configuration, used in conjunction with the system shown in FIG. 1. Components in system 200, identical to components system 100 (shown in FIG. 4), are identified in FIG. 5 using the same reference numerals as used in FIG. 4. System 200 includes server system 212 and client systems 214. Server system 212 further includes database server 216, an application server 224, web server 226, a directory server 230, and a mail server 232. A disk storage unit 234 is coupled to database server 216 and directory server 230. Servers 216, 224, 226, 230, 232 are coupled in a local area network (LAN) 236. In addition, a system administrator's workstation 238, a user workstation 240, and a supervisor's workstation 242 are coupled to LAN 236. Alternatively, workstations 238, 240, and 242 are coupled to LAN 236 via an Internet link or are connected through an Intranet.

Each workstation, 238, 240, and 242 is a personal computer, such as computer 14 (shown in FIG. 1) having a web browser. Although the functions performed at the workstations typically are illustrated as being performed at respective workstations 238, 240, and 242, such functions can be performed at one of many personal computers coupled to LAN 236. Workstations 238, 240, and 242 are illustrated as being associated with separate functions only to facilitate an understanding of the different types of functions that can be performed by individuals having access to LAN 236.

In another embodiment, server system 212 is configured to be communicatively coupled to various individuals or employees 244 and to third parties, e.g., internal or external auditors, 246 via an ISP Internet connection 248. The communication in the exemplary embodiment is illustrated as being performed via the Internet, however, any other wide area network (WAN) type communication can be utilized in other i.e., the systems and processes are not limited to being practiced via the Internet. In addition, and rather than a WAN 250, local area network 36 could be used in place of 250.

In the exemplary embodiment, any authorized individual or an employee of the business entity having a workstation 254 can access the locomotive management system. One of the client systems includes a workstation 256 located at a remote location. Workstations 254 and 256 are personal computers having a web browser. Also, workstations 254 and 256 are configured to communicate with server system 212.

While the invention has been described in terms of various specific embodiments, those skilled in the art will recognize that the invention can be practiced with within the spirit and scope of the claims.

What is claimed is:

1. A method to facilitate optimizing a winding and lamination configuration of an electric machine uses a computer including a microprocessor for executing computer functions, a database for storing optimization data, and a two-level optimization algorithm having a first optimization module and a second optimization module, said method comprises:

generating a plurality of data sets utilizing the first optimization module;

determining an optimum response surface based the data sets, utilizing the second optimization module, wherein said determining the optimum response surface includes applying one of lamination geometry variable data and a set of winding parameters at a time different than a time at which the other of the lamination geometry variable data and the set of winding parameters is applied;

determining an optimum data set based on the optimum response surface, utilizing the first optimization module; and outputting an optimum winding and lamination configuration based on the optimum data set.

2. A method in accordance with claim 1 wherein generating a plurality of data sets comprises generating a plurality of winding configurations utilizing at least one of winding parameters and motor level variables stored in the database.

3. A method in accordance with claim 1 wherein generating a plurality of data sets comprises generating a plurality of lamination geometries that satisfy a first set of performance constraints, wherein the plurality of lamination geometries are selected from standard manufactured lamination geometries stored in the database.

4. A method in accordance with claim 3 wherein determining an optimum response surface comprises:

utilizing the winding parameters and motor level variables stored in the database to determine at least one winding configuration for each generated lamination geometry that will combine with the lamination geometry to satisfy a second set of performance constraints;

outputting each winding configuration to the database; and determining an optimum winding response surface.

5. A method in accordance with claim 4 wherein determining an optimum data set comprises computing an optimum lamination solution based on the optimum winding response surface and predetermined manufacturing objectives.

6. A method in accordance with claim 5 wherein outputting the optimum winding and lamination configuration comprises:
- outputting the optimum winding and lamination configuration based on the lamination solution, and
- outputting cost and performance values corresponding to the optimum winding lamination configuration.

7. A method to facilitate optimizing a winding and lamination configuration of an electric machine uses a computer including a microprocessor for executing computer functions, a database for storing optimization data, and a two-level optimization algorithm having a first optimization module and a second optimization module, said method comprises:
- generating a plurality of data sets utilizing the first optimization module, wherein generating the plurality of data sets comprises generating a plurality of winding configuration utilizing at least one of winding parameters and motor level variables stored in the database;
- determining an optimum response surface based the data sets, utilizing the second optimization module; wherein determining the optimum response surface comprises:
  - determining at least one lamination geometry for each winding configuration to satisfy a first set of performance constraints;
  - outputting each lamination geometry to the database; and
  - determining an optimum geometry response surface that satisfies a second set of performance constraints, based on the lamination geometries;
- determining an optimum data set based on the optimum response surface, utilizing the first optimization module; and
- outputting an optimum winding and lamination configuration based on the optimum data set.

8. A method in accordance with claim 7 wherein determining an optimum data set comprises computing an optimum winding solution based on the optimum geometry response surface and predetermined manufacturing objectives.

9. A method in accordance with claim 8 wherein outputting the optimum winding and lamination configuration comprises:
- outputting the optimum winding and lamination configuration based on the optimum winding solution, and
- outputting cost and performance values corresponding to the optimum winding lamination configuration.

10. A system to facilitate optimizing a winding and lamination configuration of an electric machine, said system comprising a computer, said computer comprising:
- a microprocessor for executing computer functions;
- a database coupled to said microprocessor for storing data; and
- a two-level optimization algorithm comprising a first optimization module and a second optimization module, said two-level optimization algorithm using data stored in said database and executed by said microprocessor, said first optimization module configured to apply one of lamination geometry variable data and a set of winding parameters at a time different than a time at which the other of the lamination geometry variable data and the set of winding parameters is applied.

11. A system in accordance with claim 10 wherein said first optimization module is a winding optimization module, said computer programmed to utilize said winding optimization module to generate a plurality of winding configurations, said optimization module utilizing at least one of winding parameters and motor level variables stored in said database.

12. A system in accordance with claim 11 wherein said second optimization module is a lamination optimization module, said computer further programmed to utilize said lamination optimization module to determine at least one lamination geometry for each winding configuration to satisfy a first set of performance constraints.

13. A system in accordance with claim 10 wherein said first optimization module is a lamination optimization module, said computer programmed to utilize said lamination optimization module to generate a plurality of lamination geometries satisfy a first set of performance constraints, and the plurality of lamination geometries selected from a set of standard manufactured lamination geometries stored in said database.

14. A system in accordance with claim 13 wherein said second optimization module is winding optimization module, said computer further configured to utilize the winding parameters and motor level variables stored in said database to determine at least one winding configuration for each generated lamination geometry that will combine with the generated lamination geometry to satisfy a second set of performance constraints.

15. A system in accordance with claim 14 wherein said computer further configured to utilize said winding optimization module to generate an optimum winding surface based on the winding configurations.

16. A system in accordance with claim 15 wherein said computer further configured to utilize said lamination optimization module to generate an optimum lamination solution based on the optimum winding response surface and predetermined manufacturing objectives.

17. A system in accordance with claim 16 wherein said computer further configured to output an optimum winding and lamination configuration based on the optimum lamination solution, and to output cost performance values corresponding to the optimum winding and lamination configuration.

18. A system to facilitate optimizing a winding and lamination configuration of an electric machine, said system comprising a computer, said computer comprising:
- a microprocessor for executing computer functions;
- a database coupled to said microprocessor for storing data; and
- a two-level optimization algorithm comprising a first optimization module and a second optimization module, said two-level optimization algorithm using data stored in said database and executed by said microprocessor, wherein said first optimization module is a winding optimization module, said computer programmed to utilize said winding optimization module to generate a plurality of winding configurations, said winding optimization module utilizing at least one of winding parameters and motor level variables stored in said database, said second optimization module is a lamination optimization module, said computer further programmed to utilize said lamination optimization module to determine at least one lamination geometry for each winding configuration to satisfy a first set of performance constraints, and wherein said computer further programmed to utilize said lamination optimization module to generate an optimum geometry response surface based on the lamination geometry, the optimum geometry response surface satisfying a second set of performance constraints.

19. A system in accordance with claim 18 wherein said computer further programmed utilize said winding optimization module to generate an optimum winding solution based on the optimum geometry response surface and predetermined manufacturing objectives.

20. A system in accordance with claim 19 wherein said computer further programmed output an optimum winding and lamination configuration based on the optimum winding solution, and to output cost and performance values corresponding to the optimum winding and lamination configuration.

21. A two-level optimization algorithm to facilitate optimizing a winding and configuration of an electric machine comprising:
 a first optimization module; and
 a second optimization module;
 wherein said first optimization module configured to generate a first optimization solution based on output from said second optimization module and said second optimization configured to generate a second optimization solution based on output from said first optimization module, said two-level optimization algorithm configured to generate a global optimization solution based on the first and second optimization solutions, said first optimization module configured to apply one of lamination geometry variable data and a set of winding parameters at a time different than a time at which the other of the lamination geometry variable data and the set of winding parameters is applied.

22. An algorithm in accordance with claim 21 wherein said first optimization module is a winding optimization module configured to generate a plurality of winding configurations utilizing at least one of winding parameters and motor level variable stored in a database.

23. An algorithm in accordance with claim 22 wherein said second optimization is a lamination optimization module configured to generate at least one lamination geometry for each winding configuration to satisfy a first set of performance constraints.

24. An algorithm in accordance with claim 21 wherein said first optimization module is a lamination optimization module configured to generate a plurality of lamination geometries that satisfy a first set of performance constraints, the plurality of lamination geometries selected from standard manufactured lamination geometries stored in said database.

25. An algorithm in accordance with claim 24 wherein said second optimization is a winding optimization module configured to utilize the winding parameters and motor level variables stored in a database to determine at least one winding configuration for each generated lamination geometry that will combine with the generated lamination geometry to satisfy a second set of performance constraints.

26. An algorithm in accordance with claim 25 wherein said winding optimization further configured to generate an optimum winding response surface based on the winding configurations.

27. An algorithm in accordance with claim 26 wherein said lamination optimization module further configured to generate an optimum lamination solution based on the optimum winding response surface and predetermined manufacturing objectives.

28. An algorithm in accordance with claim 27 wherein the global optimization solution is an optimum winding and lamination configuration based on the optimum lamination solution, the two-level optimization solution further configured to output cost performance values corresponding to the optimum winding and lamination configuration.

29. A two-level optimization algorithm to facilitate optimizing a winding and lamination configuration of an electric machine comprising:
 a first optimization module;
 a second optimization module;
 wherein said first optimization module configured to generate a first optimization solution based on output from said second optimization module and said second optimization configured to generate a second optimization solution based on output from said first optimization module, said two-level optimization algorithm configured to generate a global optimization solution based on the first and second optimization solutions, wherein said first optimization module is a winding optimization module configured to generate a plurality of winding configurations utilizing at least one of winding parameters and motor level variable stored in a database, wherein said second optimization module is a lamination optimization module configured to generate at least one lamination geometry for each winding configuration to satisfy a first set of performance constraints, and wherein said lamination optimization module further configured to generate an optimum geometry response surface based on the lamination geometry, the optimum geometry response surface satisfying a second set of performance constraints.

30. An algorithm in accordance with claim 29 wherein said winding optimization further configured to generate an optimum winding solution based on the ooptimum geometry response surface and predetermined manufacturing objectives.

31. An algorithm in accordance with claim 30 wherein the global optimization solution is the optimum winding and lamination configuration based on the optimum solution, said two-level optimization algorithm further configured to output cost and performance values corresponding to the optimum winding and lamination configuration.

* * * * *

UNITED STATES PATENT AND TRADEMARK OFFICE
CERTIFICATE OF CORRECTION

PATENT NO. : 6,934,666 B2  Page 1 of 1
APPLICATION NO. : 09/682762
DATED : August 23, 2005
INVENTOR(S) : Saban et al.

It is certified that error appears in the above-identified patent and that said Letters Patent is hereby corrected as shown below:

In Claim 6, column 7, line 10, between "the" and "lamination" insert -- optimum --.
In Claim 6, column 7, line 12, between "winding" and "lamination" insert -- and --.
In Claim 7, column 7, line 23, delete "configuration" and insert therefor
-- configurations --.
In Claim 9, column 7, line 54, between "winding" and "lamination" insert -- and --.
In Claim 13, column 8, line 20, between "geometries" and "satisfy" insert -- that --.
In Claim 14, column 8, line 25, between "is" and "winding" insert -- a --.
In Claim 15, column 8, line 34, between "winding" and "surface" insert -- response --.
In Claim 19, column 9, line 9, between "programmed" and "utilize" insert -- to --.
In Claim 20, column 9, line 14, between "programmed" and "output" insert -- to --.
In Claim 21, column 9, line 20, between "and" and "configuration" insert
-- lamination --.
In Claim 23, column 9, line 43, between "optimization" and "is" insert -- module --.
In Claim 25, column 9, line 55, between "optimization" and "is" insert -- module --.
In Claim 26, column 10, line 5, between "optimization" and "further" insert -- module--.
In Claim 30, column 10, line 46, between "optimization" and "further" insert
-- module --.
In Claim 30, column 10, line 47, delete "ooptimum" and insert therefor -- optimum --.
In Claim 31, column 10, line 52, between "optimum" and "solution" insert
-- winding --.

Signed and Sealed this

Sixth Day of November, 2007

JON W. DUDAS
*Director of the United States Patent and Trademark Office*